United States Patent
Edmonds

[11] 3,892,488
[45] July 1, 1975

[54] LASER SITE MARKING SYSTEM

[75] Inventor: Walter R. Edmonds, Fairborn, Ohio

[73] Assignee: The United States of America as represented by the Secretary of the Air Force, Washington, D.C.

[22] Filed: Feb. 22, 1974

[21] Appl. No.: 445,004

[52] U.S. Cl. ........... 356/153; 356/138; 331/DIG. 1; 219/121 L
[51] Int. Cl. ..................................... G01b 11/26
[58] Field of Search ....... 356/138, 153; 331/DIG. 1; 219/121 L

[56] References Cited
UNITED STATES PATENTS

| | | | |
|---|---|---|---|
| 3,456,651 | 7/1969 | Smart | 219/121 L |
| 3,571,748 | 3/1971 | Koester et al. | 356/138 |
| 3,703,176 | 11/1972 | Vassiliadis et al. | 331/DIG. 1 |

Primary Examiner—Ronald L. Wibert
Assistant Examiner—Paul K. Godwin
Attorney, Agent, or Firm—Richard J. Killoren

[57] ABSTRACT

A marker for a high powered laser cutting beam having a high intensity visible light source with apparatus for optically converting the solid beam from the light source to a hollow annular beam. A mirror having an aperture for passing the laser beam is positioned around the laser beam to direct the annular beam along a path surrounding and parallel to the laser beam to provide a visible marker on a work piece for indicating the position of the laser beam.

1 Claim, 2 Drawing Figures

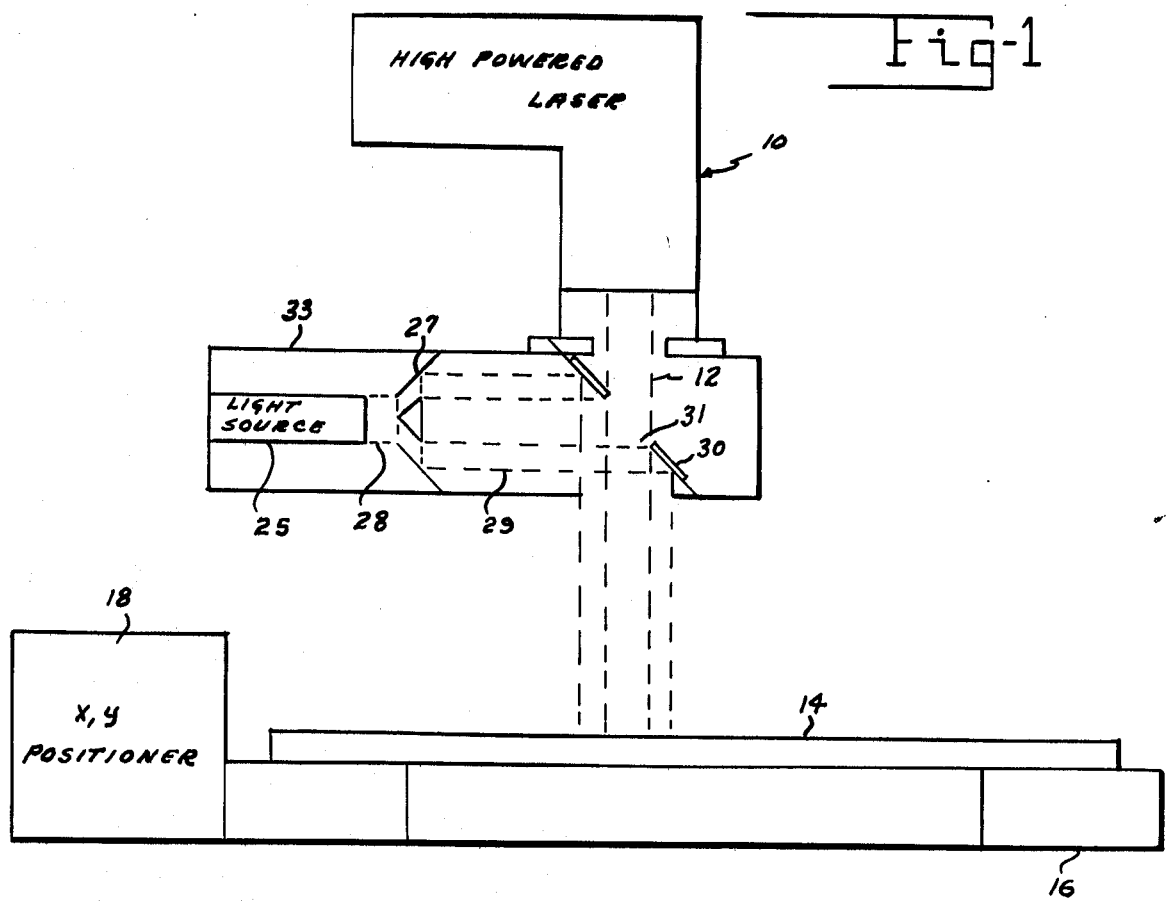

LASER SITE MARKING SYSTEM

RIGHTS OF THE GOVERNMENT

The invention described herein may be manufactured and used by or for the Government of the United States for all governmental purposes without the payment of any royalty.

BACKGROUND OF THE INVENTION

Various optical devices, such as telescopes or light sources, have been used in aligning apparatus such as gun sights, machine tools and X-ray beams and laser beams.

In these systems wherein a light beam is used for alignment, the light beam is used only in the initial alignment of the apparatus, but is not used as a marker while the apparatus is in operation. For example, when a light beam is used to align an X-ray beam, a mirror is provided to direct a visible beam along the intended path of the X-ray beam and after alignment the mirror is moved out of the X-ray path so that the X-ray beam can travel along this path. Thus, the light is not available as a marker when the X-ray is in operation. Similar systems have been used for aligning laser beams.

In drilling, cutting or welding with an invisible high power laser beam, there is a problem of maintaining the proper positioning of the laser beam on the work piece. In cutting, for example, some means is needed to indicate the position of the invisible cutting beam on the work piece.

BRIEF SUMMARY OF THE INVENTION

According to this invention, a visible beam is directed along a path parallel to and surrounding the laser beam to provide a visual indication of the position of the invisible laser beam on the work piece. Thus, the position of the invisible cutting laser beam can be more accurately controlled.

IN THE DRAWING

FIG. 1 of the drawing is a schematic diagram partially in block form of a laser marker system according to the invention.

FIG. 2 is a plan view of the circular mirror of the device of FIG. 1.

DETAILED DESCRIPTION OF THE INVENTION

Reference is now made to FIG. 1 of the drawing which shows, a high powered laser 10 normally used for cutting, welding or heat treating, such as, the Avco HPL-10 industrial laser. The laser cutting beam 12 is directed toward a work piece 14 supported on a work support table 16 which is positioned by means of an x,y positioner 18.

A light source 25, such as a He-Ne laser or other high intensity light source, directs a light beam toward a reflecting optical system 27 for converting the solid light beam 28 to a hollow annular beam 29, which is directed toward a reflecting mirror 30. The system 27 is similar to the device shown in the patent to Martin, U.S. Pat. No. 2,457,253, except that the inner member has a conical surface. The mirror 30 has an aperture 31, through which the laser beam 12 passes. The aperture 31 has a 45° eliptical shape, as shown in FIG. 2, so as to present a circular profile to substantially conform to the outer circumference of the laser beam 12 and the inner diameter of the annular beam 29. Thus, an annular light beam is projected on the work piece wherein the inner circular dark spot conforms to the outer circumference of the laser beam. By moving the work piece so that the dark spot within the annular light beam follows the desired cutting path, the laser beam is directed along the desired cutting path.

The light source 25, optical system 27 and the mirror 30 may be supported by means of a housing 33 or other support means secured to the housing of laser 10.

While the device has been disclosed for use in cutting, for some applications, it could also be used for welding or drilling with a laser beam.

Also, the device may be used with a focused cutting laser beam by adapting the optical system 27 to provide a converging marker light beam.

There is thus provided a marker light beam apparatus to aid in the positioning of a laser cutting beam.

I claim:

1. In combination with a high powered laser providing a beam for cutting a work piece which is adapted to be moved relative to the laser beam path, a laser site marking system, comprising: means for providing a high intensity annular visible light beam; means surrounding the laser beam path, for directing the annular beam along a path in close proximity and substantially conforming to the outer circumference of the laser beam; said means for providing a high intensity annular visible light beam including means for providing a high intensity solid light beam and means for converting said solid light beam to an annular light beam; said means for directing the annular beam along a path substantially conforming to the outer circumference of the laser beam comprising a flat mirror having a hole therein in the shape of a 45° ellipse whereby the hole presents a circular profile to the laser beam and said high intensity annular beam.

* * * * *